Patented Feb. 18, 1936

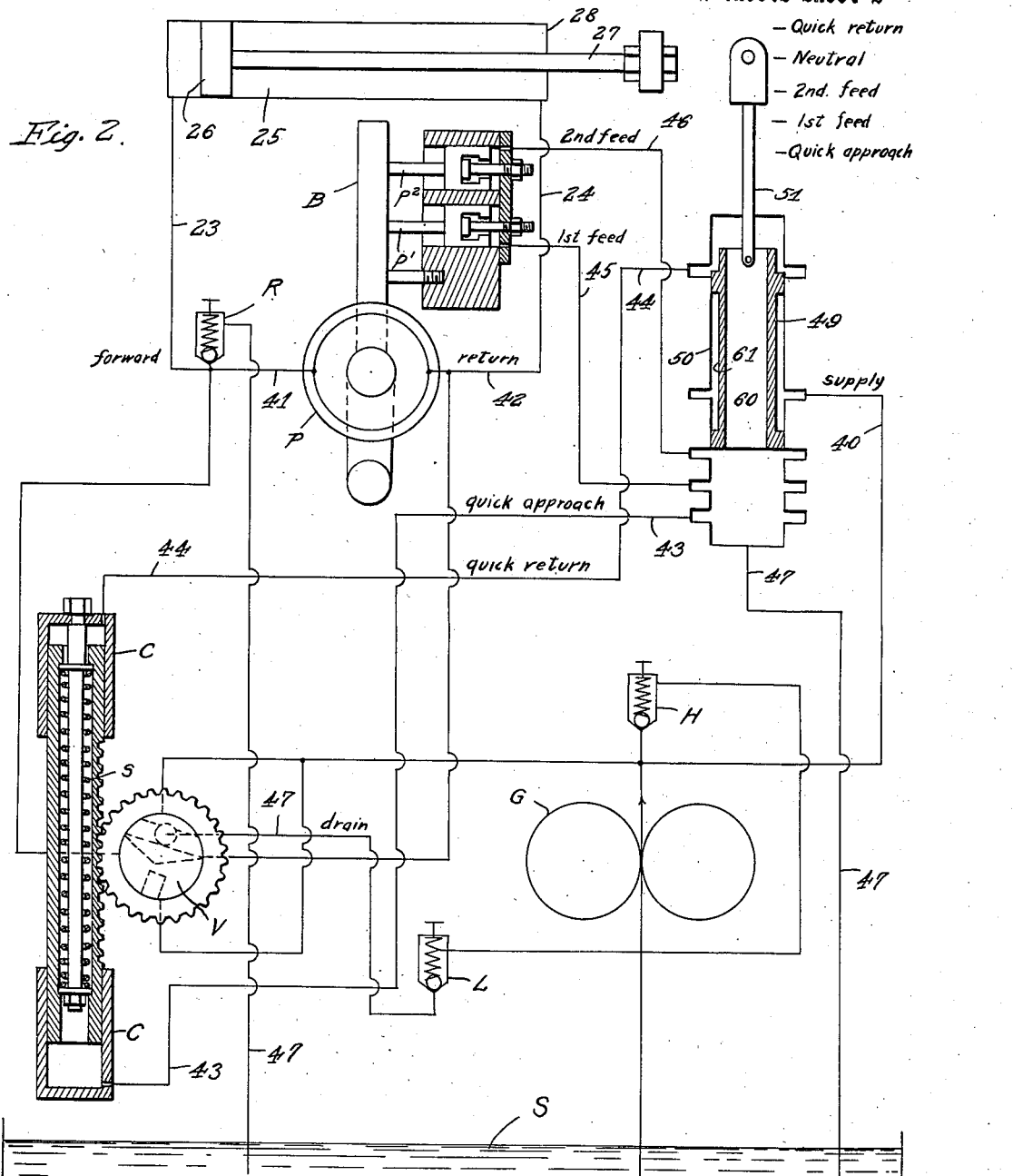

2,030,888

UNITED STATES PATENT OFFICE 2,030,888

MACHINE TOOL

Everette K. Morgan, Rockford, Ill., assignor to The Ingersoll Milling Machine Company, Rockford, Ill., a corporation of Illinois Application December 2, 1927, Serial No. 237,223

48 Claims. (Cl. 29—51)

This invention relates generally to machine tools of the type which operate in automatically defined cycles, and in certain aspects is directed more particularly to tools which are actuated hydraulically.

One object of the invention is to provide a novel mechanism for causing different automatic cycles of movements between the work and tool supports in a machine tool having a plurality of sets of tools arranged to be brought into operative association with the work by relative indexing movements between said supports.

The invention also resides in the arrangement of the tools and the mounting of the supports for enabling different metal-removing operations to be performed upon a work piece while mounted on the work support.

Another object is to provide a duplex tool of the above character having means for changing the speed of the different sets of tools to correspond to the respective operations to be performed thereby.

A further object is to provide a hydraulically actuated machine tool having a novel means for controlling the relative movements between the work and tool supports after movement of the supports toward each other has been arrested by a positive stop.

Another object is to provide a machine tool of the above character in which the tools are moved relative to their support after the stop becomes effective.

Still another object is to provide a hydraulically actuated machine tool in which the mechanism for driving the cutting tools, the pump or source of fluid pressure, and the valve mechanism controlling the cycle of operation is self-contained within a unitary head structure mounted to slide toward and away from the work to be operated upon.

The features of novelty just enumerated are all fully described in the following specification in which reference is made to the accompanying drawings, wherein—

Fig. 2 is an oil circuit diagram of the pump shown in Figure 1, and

Figs. 3 and 4 are cross-sections at an upper and lower level through a valve appearing in Fig. 2, showing the valve in rapid traverse position.

The same reference numerals are applied to corresponding parts throughout the views.

Figure 1:
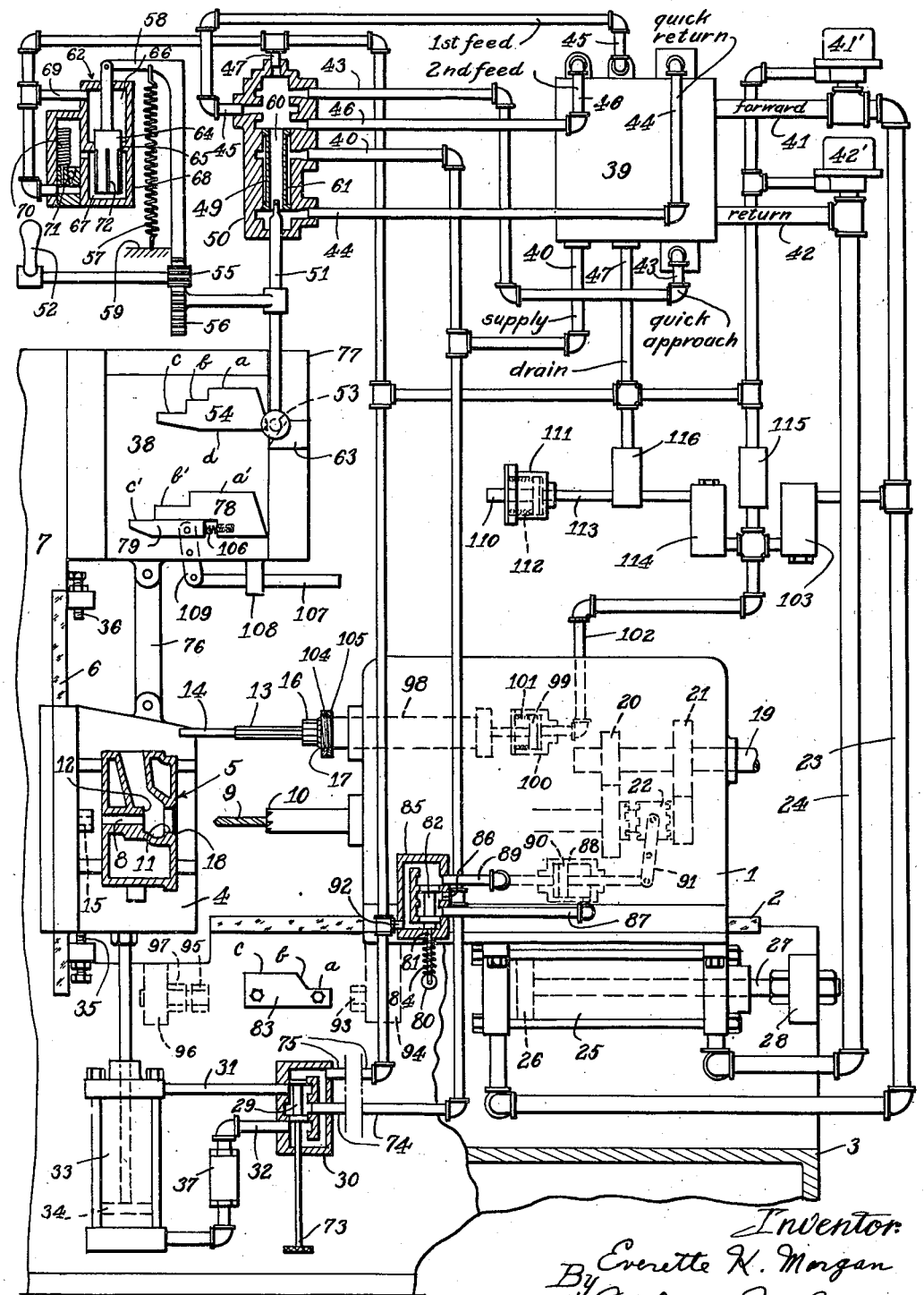
Figure 1 is a more or less diagrammatic view of a horizontal duplex boring and reaming machine embodying the hydraulic control system of my invention.

The invention as illustrated in Figure 1 is applied to a machine of the type just referred to having a tool support or carriage 1 slidably received on ways 2 on a bed 3 for movement toward and away from a support or carriage 4 having the work 5 fixed thereon for the performance of boring and reaming operations. It should be understood, however, that no limitation is to be regarded as imposed on the application of the invention by reason of any reference to this particular type of machine or to these particular kinds of operations, inasmuch as the circuits embodied in the hydraulic control system herein described have been employed in a great variety of different types and kinds of machines for performing the general run of machine tool operations above enumerated. Furthermore, no limitation on the use of the invention is to be inferred from the fact that the work carriage 4 is shown as slidable vertically on ways 6 provided on the column 7 projecting vertically from the bed 3, inasmuch as in certain applications of an indexing work carriage the same has been mounted for movement laterally relative to the tools. Broadly speaking, the one carriage is arranged to be indexed in a transverse direction relative to the movement of the other. In passing, it might also be well to point out that instead of indexing the work support or carriage relative to the tool support or carriage, as herein shown, it may be more practical in certain cases to index the tool carriage and for that reason I prefer not to limit myself to either application. Before proceeding with the description brief refeernce will be made to the work to be performed by the machine illustrated and also to the tool equipment of said machine.

The work shown at 5, selected for the purposes of the present disclosure, happens to be a cylinder head for an overhead-valve engine. The first operation performed on the casting by this machine is the drilling of the valve stem guides 8 by the drills 9, it being understood that in a head for a six-cylinder engine there will be twelve valve stem guides and hence a like number of drills on the tool carriage to drill the holes therefor. Coaxial with the drills 9 are tools 10 to counterbore the valve ports at 11 and to face the end of the valve stem guides 8 at 12. This completes the operations performed with the work disposed in its lower indexed position and the work carriage has to be shifted or indexed to bring it to its upper indexed position in line with another bank of tools, which, in the present case, happen to be illustrated as provided above the bank of tools 9 and 10. The first operation on the work in its upper indexed position is the reaming of the valve stem guides 8 by reamers 13, pilot portions 14 being provided on the reamers to enter guides 15 provided therefor on the tool carriage to insure accuracy in the operation thereof. Another set of reamers 16, coaxial with the reamers 13, come into action at the end of the first reaming operation to ream the valve ports 11, and still another set of reamers 17, coaxial with the reamers 13 and 16, come into action at the close of the second reaming operation to ream the valve seats 18. There are necessarily the same number of reamers as there are drills 9 and tools 10. The particular means employed for driving the drills and reamers is unimportant and it is, therefore, believed sufficient to state that the shaft 19 furnishes the power for the driving of both sets of spindles through either the low gears 20 or the high gears 21, depending on the position of the clutch 22. In the drawings the high gears are shown engaged for the operation of the drills. As will presently appear, however, the speed of operation of the reamers is changed during the travel of the tool carriage by the shifting of the clutch 22 to the low gears 20, the low gears being employed during the operation of the reamers 16 and 17. The gearing intermediate the high and low gears and the spindles is omitted in the drawings for convenience and inasmuch as such details are well known.

The movement of the tool carriage 1 on the ways 2 is effected by supplying oil, or other equivalent fluid medium, through either of the pipes 23 and 24 which are connected to the opposite ends of the hydraulic cylinder 25 mounted on the under side of the tool carriage, as shown. The piston 26 in the cylinder 25 is fixed by its rod 27 to the bed 3 at 28. Thus, if the oil is admitted to the cylinder 25 through the pipe 23 in front of the piston 26 and the oil in back of the piston 26 is permitted to escape through the pipe 24, the tool carriage 1 will be moved forward, that is, to the left in the drawings. The reverse is true when oil enters through pipe 24 and escapes through pipe 23. The circuits for the oil flow providing for the cycle of quick approach, (sometimes called rapid traverse forward,) feed, and quick return, (sometimes called rapid traverse reverse,) and such variations of this cycle as are herein contemplated, are all fully described hereinafter.

The indexing of the work carriage 4 is controlled by a valve 29 in a valve casing 30 the position of which determines whether oil is discharged through the pipe 31 or the pipe 32, connected to opposite ends of the hydraulic cylinder 33 supported in any suitable manner in or on the bed 3. When oil is admitted through the pipe 32 and allowed to escape through the pipe 31, the piston 34 rises in the cylinder 33 and hence the work carriage 4 is elevated from its position of rest on the adjustable stop screw 35, the setting of which determines the lower indexed position, to engagement with the adjustable stop screw 36, the setting of which determines the upper indexed position. When the carriage is in its upper indexed position, any tendency to gravitate toward the lower position is counteracted by a foot valve or back-pressure valve 37 which just balances the weight of the tool carriage with the work mounted thereon as well as the weight of a cam slide 38 to which reference will be made hereinafter.

The pump shown at 39 in Figure 1 and illustrated by the diagram of Fig. 2 is an oil gear QH pump along the general lines disclosed in Ferris Patent No. 1,854,127. Reference should be made to both views in the following description of this pump and its connections. The pump is shown in Figure 1 as suitably supported for movement with the tool carriage 1 and as having pipes numbered 40–47 extending to and from the same. In the pump 39 is a low pressure gear pump section G capable of delivering 2400 cu. ins. of oil per minute at a low pressure of say thirty pounds determined by one relief valve L or up to a higher pressure of say two hundred and fifty pounds determined by another relief valve H. The pump 39 also comprises a variable delivery high pressure rotary piston pump section P delivering from 0 to 400 cu. ins. of oil per minute up to a pressure of say one thousand pounds per sq. in. determined by a relief valve R. The gear pump G is always connected to pipe 40 marked "Supply" but is also arranged to be connected to either of the pipes 41 or 42, as will presently appear. The piston pump P delivers through the pipe 41 marked "Forward" communicating with pipe 23, or the pipe 42 marked "Return", communicating with the pipe 24, the pipes 23 and 24 as previously mentioned, being connected to the hydraulic cylinder 25. The pipes 43 and 44 marked "Quick Approach" and "Quick Return", respectively, are connected with opposite ends of a cylinder CC in the casing of the pump 39 in which a plunger is reciprocable one way or the other, depending on which of the two pipes mentioned is placed in communication with the supply pipe 40. The piston is normally held in a neutral mid position by a spring acting against opposite ends thereof but when moved under hydraulic pressure operates a rotary valve V. This valve when the plunger is moved in one direction, say by oil delivered through pipe 43, for example, places the pipe 41 in communication with the gear pump G, the port for relief valve L being closed at the same time so that the 2400 cu. ins. capacity of the gear pump is delivered through the pipe 41 at any pressure not in excess of that for which the relief H is set. The return pipe 42 at the same time is placed in communication with the drain 47. Before the operation of the valve V by the plunger, the forward pipe 41 is in communication only with the piston pump P and the return pipe 42 is in communication with the drain 47. Now, assume that the rotary valve V is operated in the opposite direction by reason of the oil delivered through the pipe 44; in that case the return pipe 42 is placed in communication with the gear pump G and again the port for the relief valve L is closed so that the full delivery of the pump G is discharged through the return pipe 42. At the same time the forward pipe 41 is placed in communication with the drain 47. The delivery of the piston pump P is determined by the extent to which its pintle is moved off-center by a rocker beam B. The latter is normally held under spring pressure in a neutral position resting against a stop, as shown, but is operable to predetermined positions by one or both of two pistons $p^1$ and $p^2$, which in turn are operated when oil from the supply pipe 40 is delivered through one or both of the pipes 45 and 46 marked "First Feed" and "Second Feed", respectively. The piston $p^1$ associated with the pipe 45 is arranged to move the pintle off-center to a greater extent than the piston $p^2$ associated with the pipe 46.

Consequently, in the first case, there will be a greater delivery from the piston pump P than in the other case and this, as will presently appear, accounts for the first feed being more rapid than the second feed. The pipe 47 marked "Drain" is the common free return to a sump S for both sections G and P of the pump 39 and is at atmospheric pressure.

The movement of the tool carriage it may now be stated, is controlled by a valve 49 shiftable in its casing 50. The latter has ports communicating with the pipes 40 and 43—47. The control valve casing is supported for movement with the pump 39 and hence moves with the tool carriage. In the diagrammatic showing of this system in Figure 1 the piping rigidly connected with parts on the tool carriage will serve to convey the impression that the pump 39 and valve casing 50 move with the tool carriage. The control valve 49 is shiftable by means of a rod 51, manually by the operation of a handle 52 and automatically by a roller 53 operating on the cam 54. The handle 52 serves to turn a pinion 55 meshing with a rack 56 connected to the rod 51, the operation of the valve 49 upwardly being against the action of a tension spring 57 attached at one end to an arm 58 on the rack 56 and at the other end to a part of the tool carriage 1, or any part arranged to move therewith. The spring 57 is thus arranged to be placed under tension when the valve 49 is shifted to its uppermost position in the casing 50. Hence the valve tends to move downwardly under the action of the spring. The roller 53 is thus urged against the cam 54 under the spring tension and the valve 49 is reset from the uppermost position to different positions in the valve casing according to the contour of the cam in a manner believed to be evident. The valve 49 is tubular and thus provides a passage 60 therethrough and is also cut away annularly on the outside thereof, as at 61, to permit the passage of oil about the same in said casing in different positions of the valve.

In operation, the cycle of quick approach, feed, quick return, and stop, is commenced by the operator manipulating the handle 52 to shift the control valve 49 to its uppermost position in the casing 50. This places the pipes 43, 45 and 46 in communication with the supply pipe 40 and leaves the pipe 44 in communication with the drain 47 through the passage 60. The oil under pressure from the pipe 40, that is, up to 30 pounds pressure, is thus made to act against the two pistons $p^1$ and $p^2$ associated with the pipes 45 and 46. The piston pump P is, therefore, thrown from neutral into its full delivery by reason of the fact that the pintle thereof is moved off center the full extent by the piston $p^1$ associated with the pipe 45. It is true that the piston $p^2$ associated with the pipe 46 has also been operated but inasmuch as it does not move as far as the piston associated with the pipe 45 it does not, in reality, take part in the operation just referred to. By the expression "full delivery" is meant any delivery up to 400 cu. ins. according to what the pump P is set for. For instance, the 1st feed may be set, say, for 300 cu. ins. delivery while the 2nd feed may be set, say, for 100 cu. ins. delivery. In that case, the piston associated with the pipe 45 will be allowed enough movement to throw the pintle off center far enough to insure the 300 cu. ins. delivery and the piston associated with the pipe 46 will be allowed enough movement to throw the pintle off center far enough to insure the 100 cu. ins. delivery.

Simultaneous with the throwing into operation of the piston pump, oil is delivered through the pipe 43 from the supply pipe 40 to shift the rotary valve V of the pump 39 to open communication between the gear pump G and the pipe 41, and to close the port for the 30 pound relief valve L of the gear pump so as to permit the full delivery of the 2400 cu. ins. of oil per minute from the latter up to the pressure of 250 pounds permitted by the other relief valve H of said pump. If the piston pump is set to deliver 300 cu. ins., as assumed above, there is a combined delivery of oil through the pipe 41 from the piston pump and the gear pump approximating 2700 cu. ins. per minute for the quick approach movement of the tool carriage. The roller 53 in this movement travels to the left along part $a$ of the cam 54, and the drills 9 move from the fully retracted position shown into position to commence the drilling of the valve stem guides 8. When the roller reaches the end of part $a$ it drops down a step to part $b$ and causes the shifting of the valve 49 for the 1st feed in which the drilling of the valve stem guides is commenced. In this new position of the valve 49, the pipe 43 is cut off from communication with the pipe 40 and only the pipes 45 and 46 are left in communication with the latter. Consequently, the pipe 43 is placed in communication with the drain 47 and the piston associated with the rotary valve V returns to normal position, closing off communication between the pipe 41 and the gear pump G and again opening the port leading to the 30 pound relief valve L of the gear pump. The only oil, therefore, that can be delivered for the feed movement through the pipe 41 is that supplied by the piston pump. In other words, the delivery is cut down from 2700 cu. ins. to 300 cu. ins. delivery of the piston pump. The 1st feed continues so long as the roller 53 operates along part $b$ of the cam 54. When the roller drops a step from part $b$ to part $c$ the 2nd feed is commenced, in which the drilling of the valve stem guides 8 continues and there is commenced the counterboring of the valve ports at 11. In this new position of the valve the pipe 45 is cut off from communication with pipe 40 and only pipe 46 is left in communication with the latter. Now, assuming that the piston associated with the pipe 46 is allowed enough movement to throw the pintle of the piston pump off center far enough to secure 100 cu. ins. delivery, only that amount will then be delivered through the pipe 41 for the 2nd feed movement of the tool carriage. The 2nd feed continues until roller 53 drops off the end of part $c$ of the cam 54 which is at the point when the tools 10 have faced off the ends of the valve guides 8 at 12. The means shown at 62 has a dashpot action, as will presently appear, which prevents the valve 49 from dropping abruptly. Thus, the tool carriage is forced to make a pause of anywhere from a fraction of a second to a few seconds before commencing the quick return. This pause is advantageous in that it permits the tools 10 to make a finish cut and no tool marks will be left on the work at 12. In the shifting of the valve 49, caused by the dropping of the roller 53 off part $c$ of the cam 54, the pipe 46 is cut off from communication with the pipe 40 and consequently the piston pump is thrown out of operation by the return of its pintle to neutral. When the valve 49 reaches its lowermost position in the casing 50 the pipe 44 is thrown into communication with the pipe 40 for the quick return of the tool carriage. The rotary valve V is thereby operated just as in the case of quick approach but in the opposite direction so as to open communication between the return pipe 42 and the gear pump G and between the pipe 41 and the drain, and to close the port for the 30 pound relief valve L of the gear pump so as to cause the full delivery of the gear pump up to a pressure of 250 pounds to pass through the pipe 42 for the quick return of the tool carriage. During the return the roller 53 travels along part $d$ of the cam 54, and at the end of the return movement said roller is elevated upon coming into engagement with the face of a cam 63 for the shifting of the control valve 49 to the neutral position, in which the same is shown in Figs. 1 and 2. The moment the valve is shifted to the neutral position, where the pipe 44 is cut off from communication with the pipe 40, the rotary valve returns to its normal closed position and communication between the return pipe 42 and the gear pump is cut off so that the tool carriage comes to a halt. It is then in its fully retracted position as shown in the drawings. The movement of the tool carriage under the action of the motive fluid is rendered absolutely positive by the elimination of any air bubbles in the system through the air leaks 41' and 42' connected with the drain 47 in the manner shown.

The dashpot means shown at 62, in which no invention is claimed in this case excepting only insofar as it contributes toward the novelty herein disclosed, comprises a solid piston 64 connected to the arm 58 of the rack 56 and reciprocable in an opening 65 provided between two chambers 66 and 67 in a closed casing 68. The chamber 66 communicates through a pipe 69 with the drain 47 so as to be supplied with oil therefrom. The chamber 67 communicates with the chamber 66 through the pipe 69 in one direction through the capillary tube 70 and in the opposite direction through a check valve 71. In operation, the piston 64 is shifted into the chamber 66 when the handle 52 is manipulated to shift the control valve 49 to the upper end of its casing. The oil displaced from chamber 66 by the piston by-passes through the check valve 71 into the chamber 67, it being understood that the casing is entirely filled with oil from the drain 47. In the dropping of the roller 53 from part $a$ to $b$ and from part $b$ to part $c$ on the cam 54 there is no appreciable dashpot action because of the provision of slots 72 in the outside of the piston which permit fairly free bypassing of oil past the piston from the chamber 67 into the chamber 66. However, when the roller 53 drops off the part $c$ the ends of the slots 72 have reached the opening 65 and a dashpot action results by reason of the fact that oil in the chamber 67 is forced to pass through the capillary tube 70 in order to get to the chamber 66.

The hydraulic circuit above described has been employed, as stated before, on a large variety of machine tools. I have made refinements in said circuit, the first to which reference will be made being the provision for indexing the work after the completion of one operation so that another operation may be performed, and the shifting into position of a different cam to control the movement of the tool carriage for the new operation. I have shown this application to a duplex machine wherein the work is indexed from one position for drilling to another position for reaming. It will be apparent, as stated before, that other operations might be performed and that the tool carriage might be indexed instead of the work carriage. It will also be evident that this feature is not limited to use in a duplex type machine. It will be observed that the circuit above described only takes care of the cycle of movement of the tool carriage in the operation of the drills 9 and tools 10. According to my invention, however, the work may be indexed by the manipulation of the handle 73 of the valve 29 to shift the latter from the position in which it is shown, where the pipe 74 communicating with the supply pipe 40 is in communication with the pipe 31, to a position where the pipe 31 is cut off from communication with the pipe 74 and placed in communication with the drain 47 through the pipe 75, the pipe 32 being at the same time placed in communication with the pipe 74. This results in the elevation of the work carriage 4 into engagement with the stop screw 36, as previously described, where the work is brought into position to be operated upon by the reamers 13, 16 and 17. The break in the pipes 74 and 75, indicated by the dot and dash lines, shows diagrammatically where sections of flexible conduit are employed so that the movement of the tool carriage is permitted with reference to the valve casing 30 fixed on the bed 3 of the machine. In the indexing movement of the work carriage the slide 38, connected by a link 76 to the work carriage and mounted for reciprocation in ways provided in a bracket 77 on the column 7, is elevated to such an extent that the cam 78 provided on said slide is brought into precisely the position formerly occupied by the cam 54. That is, the cam 78 is transposed to the position of the cam 54, the latter being elevated out of the way. Thus, the roller 53 will follow the contour of the cam 78 in the performance of the reaming operations. The movements of the tool carriage are made to conform to the requirements of the reaming operations by the provision of the proper contour on the cam just as in the case of the performance of the drilling operations. In actual practice the cams 54 and 78 are mounted conveniently on some part of the bed where the roller 53, moving relative thereto in the movement of the tool carriage, causes shifting of the control valve 49 in a manner believed to be self-evident. The roller 53 moves along part $a'$ of the cam 78 during quick approach, in which the pilot portions 14 of the reamers 13 are entered through the valve stem guides 8 for entry into guides 15, and the end of the reamers 13 are brought up to the end of the valve stem guides. In this movement there is a combined delivery of oil from the gear and piston pump sections of the pump 39, as fully outlined above. When the roller 53 drops down a step from the part $a'$ to the part $b'$ the 1st feed commences in which the reamers 13 ream the valve stem guides 8 and the pilot portions 14 keep the reamers accurately centered. During the feed movement of the tool carriage the only oil delivered to the pipe 41 is that furnished by the piston pump similarly as in the cycle above described, no oil being delivered to said pipe from the gear pump. When the roller 53 leaves the end of part $b'$ of the cam 78 it drops onto a part $c'$ provided by the top of a movable latch 79 to which further reference will be made hereinafter. In this new position of the control valve 49 the tool carriage is caused to move slower for what is termed the 2nd feed. In this feed the reamers 16 enter the valve ports 11 and ream the same. The high gears 21, which were engaged during the operation of reamers 13 in the reaming of the valve stem guides 8, drive the spindles at a speed too high for the proper functioning of the reamers 16 and 17. This introduces another novel feature of my invention, namely, the provision of means for shifting gears during the travel of the tool carriage whereby the speed of operation of the spindles may be changed to suit requirements. This feature will now be described.

At the commencement of the 2nd feed, when the reamers 16 are just entering the valve ports 11, a roller 80 mounted on the end of the stem 81 of a valve 82 has come into position over part $a$ of a cam 83 and is elevated by riding up part $b$ of said cam onto part $c$ thereof against the action of a coiled compression spring 84, which normally holds the valve 82 in the position illustrated in the drawings. The valve 82 is thereby shifted in its casing 85 from the position shown, where the pipe 86 communicating with the supply pipe 40 is in communication with a pipe 87 extending to one end of a hydraulic cylinder 88, to a position where the pipe 86 is placed in communication with a pipe 89 connected to the other end of the hydraulic cylinder 88. The piston 90 in the cylinder 88, which, as shown, is connected to a rocker arm 91 having a yoke portion for the operation of the clutch 22, is thereby moved from the position shown, where the clutch 22 is in engagement with the high gears 21, to the opposite position where said clutch engages the low gears 20. The speed of operation of the spindles is, therefore, reduced to the desired degree for the proper operation of the reamers 16 and 17. It will be observed that when one of the two pipes 87 and 89 is in communication with the pipe 86 the other one of the two is in communication with the drain 47 through pipe 92. The 2nd feed continues with the roller 53 riding along part $c'$ provided by latch 79 of the cam 78 until the reamers 17 ream the valve seats 18, at which time the head 93 of a bolt carried by a lug 94, depending from the tool carriage 1, comes into engagement with the head 95 of a bolt adjustably received in a lug 96 provided in the bed 3 of the machine. A lock nut 97 is provided to fasten the latter bolt in any adjusted position. This brings up still another novel feature of my invention, namely, the provision of the positive stop for the tool carriage whereby the carriage is caused to pause and the pump is caused to build up pressure to a predetermined point, at which tools are arranged to be fed in relation to the tool carriage toward the work an amount predetermined by the adjustment of stop collars provided for the purpose. This feature will now be described in detail.

When the tool carriage arrives at the end of the forward stroke and before it commences the return it will be manifest that it is important that the reamers 17 shall have completed the reaming of the valve seats 18. It is practically impossible, however, to make a set-up of twelve reamers in a bank and insure operation to such a fine point of accuracy inasmuch as there is bound to be variations in the amount of end play in the different spindles and there is also bound to be some variation in the reamers themselves which might, for example, be caused in the sharpening of certain of said reamers more than others. For that reason the spindles 98 of the reamers are arranged to have some slight freedom for endwise movement with pistons 99, mounted on the inner ends thereof and arranged for slight movement in hydraulic cylinders 100 against the action of compression springs 101 which normally keep the spindles in a retracted position. Now, assuming that when the tool carriage 1 arrives at the end of the stroke, with the head 93 of the one bolt engaging the head 95 of the other bolt, there are certain reamers 17 which have not completed the reaming of the valve seats 18. If that is the case it is obviously necessary that such tools be given some slight feed movement in relation to the tool carriage. I provide means for moving the tool spindles under hydraulic pressure relative to the tool carriage. Connected to the back of the cylinders 100 are pipes 102 which communicate through resistance valves 103 with the pipe 23 and hence with the forward pipe 41. The valves 103 may be set for example, for a resistance of, say, 600 pounds. Then, when the tool carriage comes to a halt in engagement with the positive stop, pressure will build up in the pipe 23 by reason of the continued operation of the pump (the piston pump) and when a pressure of slightly in excess of 600 pounds is reached, the valve 103 will yield and permit the oil under pressure to enter the cylinders 100. The pistons 99 in all of the cylinders will be moved against the action of the springs 101 if the adjustable stop collars 104 provided on the spindles 98 have not already come into engagement with the work and thus insured that the valve seats 18 have been fully reamed. The collar 104 appearing in the drawings is shown as threadedly mounted on the spindle. This permits the adjustment thereof to exactly the right place where it may then be locked by the tightening of a lock nut 105 provided in connection therewith. The feature whereby the spindles may be advanced relative to the tool carriage at the end of the stroke may, of course, be utilized for some other purpose than that of merely insuring a standard uniform cut of the tools as just described, and that, if desired, in one or more, if not all, of the spindles may be arranged for advancement relative to the tool carriage. It will be evident that during the operation just described the roller 53 is still resting on the part $c'$ of the latch 79 of the cam 78. The tool carriage, of course, cannot commence the quick return until the roller 53 is permitted to drop, as it did on leaving part $c$ of the cam 54 in the cycle above described, to bring the control valve 49 to the lowermost position in the casing 50. The building up of pressure or overloading, as will now be described, is utilized to actuate a trip to cause the quick return of the tool carriage.

Immediately following the advancement of the spindles under hydraulic pressure, as above described, the latch 79 is arranged to be tripped to release the roller 53 so that the control valve 49 can descend to its lowermost position in the casing 50 to cause the tool carriage to commence the quick return. The latch 79 is arranged to be moved against the action of a spring 106 by a rod 107 slidably received in a lug 108 on the slide 38 and pivotally connected to one end of a rocker arm 109, the other end of which is attached to the latch. A plunger 110 has a piston portion working in a hydraulic cylinder 111 and arranged to be moved against the action of a spring 112 under hydraulic pressure admitted through the pipe 113 connected to said cylinder behind the plunger. The plunger 110 has the end thereof disposed in engagement with the outer end of the rod 107 when the tool carriage is at the end of its forward stroke. Hence, the moment the plunger is moved under hydraulic pressure the latch 79 is tripped and the quick return of the tool carriage will be accomplished. Following the building up to a pressure of 600 pounds, to overcome the resistance of the valve 103, the pressure builds up still higher and overcomes the resistance of another valve 114 which, for example, may be set for a resistance of, say 800 pounds, so that oil under pressure is admitted to the cylinder 111 to operate the plunger 110 and thereby trip the latch 79. In the quick return movement of the tool carriage, similarly as in the cycle above described, the full delivery of the gear pump is delivered to the return pipe 42. At the end of the return stroke the roller 53 encounters the cam 63 and the valve is thereby elevated to the neutral position shown in the drawings whereupon the tool carriage comes to a halt. The pistons in the hydraulic cylinders 100 and the hydraulic cylinder 111 are arranged to return under the action of their springs by the leakage of the oil through capillary tubes suitably provided in the casings 115 and 116, both of which have communication with the drain 47.

It is believed that the foregoing description conveys a clear understanding of my invention and of its various objects and advantages. It will be understood that the invention is capable of various other applications than the particular one herein shown and described. All modifications, adaptations, and variations of the invention it should, therefore, be understood are to be construed as embraced by the appended claims.

I claim:

1. In a machine comprising a tool support and a work support, one of said supports being movable relative to the other support for the performance of an operation on the work, the tool support having different tools for performing more than one operation on the work, a single variable delivery pump, a single control valve for controlling the pump's delivery, means operative under fluid pressure for communicating movement to the movable support, said control valve controlling communication between the pump and the last mentioned means to determine the speed and direction of movement of the support according to the position of said valve, and plural means for controlling the control valve, each according to the requirements of the operation being performed and according to what tool or tools are in use.

2. In a machine comprising a tool support and a work support, one of said supports reciprocating transversely relative to the other support for the performance of an operation on the work, the tool support having tools for performing more than one operation on the work, a variable delivery pump constituting a source of pressure fluid supply, a control valve for controlling the pump's delivery, means operative under fluid pressure for communicating movement to the reciprocating support, said valve controlling communication between the pump and the last mentioned means to determine the speed and direction of movement of said support in accordance with the position of said valve, means for indexing one of said supports to change the relationship between the work and the tools so that after one operation is completed another operation may be performed, cam means for operating said control valve one or more times in one or more positions of advance of the moving support to cause predetermined movements of the reciprocating support in the one operation, and another cam means arranged to be indexed to the proper position when the support is indexed to cause predetermined movements of the reciprocating support in the performance of the other operation.

3. In a machine comprising a work support and a tool support, one of said supports reciprocating transversely relative to the other support for the performance of an operation on the work, said tool support having tools for the performance of more than one operation, a single source of pressure fluid supply, means operative under fluid pressure to communicate movement to the reciprocating support, a control valve controlling the admission of fluid pressure from the supply source to said means, means operative under fluid pressure for indexing one of said supports after the completion of one operation on the work for the performance of another, a control valve between the supply source and the last mentioned means controlling the admission of pressure fluid thereto, separate control cams for controlling the first mentioned control valve for the different operations, and means arranged in the indexing of the support to shift into operative position the proper cam for the operation to be performed after the indexing.

4. In a machine comprising a work support and a tool carriage reciprocating transversely relative to said support to perform an operation on the work, a single source of pressure fluid supply, means operative under fluid pressure to communicate movement to said carriage, a control valve operated in the movement of said carriage to control the amount and direction of pressure fluid admitted to said means accordingly to control the movements of said carriage, the tool or tools of said tool carriage having change speed gears for the operation thereof at different speeds, means operative under fluid pressure for throwing different gears into operation, and another control valve arranged to be operated in the movement of said tool carriage to control the admission of pressure fluid from said source to said last mentioned means whereby to change the speed of operation of the tool or tools during the movement of said carriage.

5. In a machine as set forth in claim 4 wherein the last mentioned control valve is mounted for movement with said carriage and has the shiftable element thereof normally disposed in one position maintaining the tool or tools at a given speed of operation, a cam arranged to be encountered in the movement of the tool carriage to operate said control valve to a different position to change the speed of operation of the tool or tools at a particular point in the travel of the tool carriage depending on the location of said cam.

6. In a machine comprising a work support and a tool support, one of said supports being movable relative to the other for the performance of an operation on the work, said tool support having tools for the performance of more than one operation, a source of pressure fluid supply, means operative under fluid pressure to communicate movement to the movable support, a control valve operated in the movement of said support to control the admission of pressure fluid to said means, means for indexing one of said supports after the completion of one operation on the work to permit the performance of another, variable speed gearing for driving said tools at different speeds, means operative under fluid pressure for operating said gearing to change the speed of operation of said tools, and another control valve arranged in the movement of the movable support during the performance of at least one of the operations on the work for admitting pressure fluid to said last mentioned means to change the speed of operation of the tools.

7. In a machine comprising a work support and a tool support, one of said supports reciprocating transversely relative to the other for the performance of an operation on the work, means controlling the movement of the reciprocating support whereby the same comes to a standstill at the end of its forward stroke with a tool or tools at or near a limit position relative to the work, a source of pressure fluid supply, means operative under fluid pressure arranged to move a tool or tools relative to the tool support to the limit position so that all of the tools are brought to a limit position, and means for admitting pressure fluid to said last mentioned means when said support comes to a halt.

8. In a machine comprising a work support and a tool carriage reciprocating transversely relative to the work support to perform an operation on the work, a source of pressure fluid supply, means operative under fluid pressure for moving the tool carriage toward the work support, a stop for bringing the tool carriage to a standstill at a certain point, the source of pressure fluid supply being arranged to build up pressure in the line when the tool carriage is stopped, and means arranged to be operated when a predetermined pressure is reached to move a tool or tools of the tool carriage relative thereto toward the work.

9. A machine as set forth in the preceding claim wherein the last mentioned means is operative under fluid pressure and is arranged to be placed in communication with the source of pressure fluid supply when the latter has built up pressure to a predetermined point.

10. A machine as set forth in claim 8 wherein the tool or tools of the tool carriage are arranged to be limited in their movement by the work.

11. In a machine comprising a work support and a tool carriage reciprocable transversely relative to the work support to perform an operation on the work, a source of pressure fluid supply, comprising a variable delivery pump, means operative under fluid pressure to communicate movement to said carriage, a stop arranged to limit the movement of said carriage toward the work, the source of pressure fluid supply being arranged to build up pressure when the carriage is stopped, means responsive to a certain predetermined pressure arranged when the source has built up pressure to the predetermined point to cause the movement of a tool or tools of said carriage relative thereto toward the work, and another means responsive to a predetermined pressure arranged when the source has built up pressure to the predetermined point to cause the return movement of the carriage.

12. In a machine comprising a tool support and a work support, one of said supports reciprocating transversely relative to the other support for the performance of an operation on the work, the tool support having tools for performing more than one operation on the work, a variable delivery pump for supplying pressure fluid, a control valve for controlling the pump's delivery as well as the direction of flow to the fluid operated means, means operative under fluid pressure for communicating movement to the reciprocating support at a speed and in a direction according to the position of the control valve, means for indexing one of said supports to change the relationship between the work and the tools so that after one operation is completed another operation may be performed, cam means for controlling said control valve to cause predetermined movements of the reciprocating support in the one operation, and another cam means for operating said control valve after the indexing of said support to cause predetermined movements of the reciprocating support in the performance of the other operation.

13. In a machine comprising a work support and a tool support, one of said supports reciprocating transversely relative to the other support for the performance of an operation on the work, the tool support having tools thereon for the performance of more than one operation on the work, means for indexing the work support after the performance of one operation by one tool or tools so that another tool or tools may perform an operation on the work, a variable delivery pump for supplying pressure fluid, a control valve for controlling the pump's delivery as well as the direction of flow to the fluid operated means, means operable under fluid pressure for communicating movement to the reciprocating support at a speed and in a direction according to the position of the control valve, separate cams for the several operations to cause different predetermined movements of the reciprocating support as required for the different operations, and means arranged in the indexing of the work support from one position to another to bring into position the cam for the operation to be performed.

14. In a machine of the character described, a work support arranged normally in a fixed position, a tool support reciprocable transversely relative to the work support to perform an operation on the work, said tool support being of the duplex type and having two different kinds of tools thereon for that many operations, a variable delivery pump for supplying pressure fluid, means operative under fluid pressure for communicating movement to said tool support, a control valve controlling the delivery of said pump to said means so as to control the speed and direction of movement of said support, a cam associated with the one kind of tool or tools for operating said valve to control the speed and direction of movement of the tool support according to the operation to be performed, means operative under fluid pressure for moving the work support to index the work from position adjacent the one kind of tool or tools to the other, a control valve for admitting pressure fluid from the line to said means to operate the latter, and another cam associated with the other kind of tool or tools arranged to operate the first mentioned control valve according to the operation to be performed after the indexing of the work.

15. In a machine comprising a work support and a tool support, one of said supports reciprocating transversely relative to the other for performing operations on the work, the tool support having different kinds of tools adapted for the performance of a plurality of operations on the work, a variable delivery pump for supplying pressure fluid, means operative under fluid pressure to communicate movement to the reciprocating support, a control valve for controlling the delivery of said pump to said means, a plurality of control devices adapted for separate operation of the control valve according to the operation to be performed on the work, the tools of said tool support having change speed gears permitting the operation thereof at different speeds, means operative under fluid pressure for throwing different gears into operation, and another control valve arranged to be operated during the performance of at least one operation to control the admission of pressure fluid from the same pump to the last mentioned means.

16. In a machine comprising a work support and a tool support, one of said supports reciprocating transversely relative to the other to cause the performance of an operation on the work, a variable delivery pump for supplying pressure fluid, a control valve for controlling the delivery of said pump, means arranged to be supplied with pressure fluid in accordance with the position of said control valve for communicating movement to the reciprocating support, said support being arranged to engage a positive stop at one end of its stroke, the pressure in the line being arranged to build up while said support is at a standstill, means adapted to be operated when a predetermined pressure is reached to communicate movement to the tools toward the work, and means adapted to be operated when a higher predetermined pressure is reached to cause a shifting of the control valve and thereby cause the return of said reciprocable support.

17. In a trip mechanism for a hydraulic control system, the combination with a valve member arranged to be shifted, of a spring-actuated plunger having connection with said valve member whereby to be shifted with it or shift the same under spring action, a cam cooperating with the plunger to limit its movement and determine different positions of the valve member, a manually operable member having connection with the valve and plunger arranged at the beginning of a cycle to shift the valve and at the same time set the plunger in a predetermined position, a latch at one end of the cam arranged releasably to hold the plunger in a certain position against the action of its spring, means arranged to be automatically operated at a certain point in the cycle to trip the latch and allow a certain amount of movement of the plunger to bring about a corresponding movement of the valve member, and means arranged at the end of the cycle to move the valve member back to neutral position against the action of the spring-actuated plunger.

18. In a trip mechanism, the combination with a valve member arranged to be shifted to positions in either direction from a neutral position, of a manually operable member having connection with said valve member for shifting the same from neutral position in one direction to produce movement of a machine tool carriage in a certain direction from a starting position, spring loaded means arranged in the shifting of the valve member by the manually operable member to be placed under tension, a cam cooperating with the manually operable member to limit its movement and determine different positions of the valve member, a catch associated with the cam to hold the valve member on one side of neutral position against movement under the action of the spring-loaded means, and means arranged to be automatically operated at a certain point in the cycle to trip the catch so as to permit of the shifting of the valve member under the spring action of said means past the neutral position to a new position, as for example, to bring about return movement of the machine tool carriage.

19. In a control mechanism of the character described, the combination with a valve member arranged to be shifted to different positions, of a manually operable member, means providing connections between said members whereby the shifting of the latter is arranged to cause shifting of the former, a load and fire mechanism associated with the valve member, the manually operable member being arranged in the shifting of the valve member from neutral position to starting position for a cycle to cock said load and fire mechanism, and means arranged to be automatically operated at a certain point in the cycle to trip the load and fire mechanism whereby to shift said valve member past the neutral position, said means comprising a cam for limiting the movement of the valve member to determine different positions thereof on one side of neutral position, and a movable cam part arranged to hold the valve member against movement to the other side of neutral position, said movable cam part being arranged to be shifted to release the valve member for movement past neutral under the action of the load and fire mechanism.

20. In a hydraulically operated machine, a movable carriage, a stop arranged to be engaged by said carriage to bring it to a standstill at a certain point in its travel, a source of pressure fluid supply, means operative under fluid pressure for moving the carriage arranged when the latter is stopped to have pressure built up therein beyond the normal operating pressure, a control valve for controlling the delivery of the pressure fluid from said source to the last mentioned means, a cam member for shifting the valve, the valve member and cam member being movable relative to one another in the movement of the carriage, there being no relative movement when the carriage is stopped, and means adapted to be operated when a predetermined pressure is built up to for causing relative movement between said members.

21. In a hydraulically operated machine, a movable carriage, a stop arranged to be engaged by said carriage to bring it to a standstill at a certain point in its travel, a source of pressure fluid supply, means operative under fluid pressure for moving the carriage arranged when the latter is stopped to have pressure built up therein beyond the normal operating pressure, a device associated with said machine arranged to be operated under fluid pressure, said device being adapted to perform a function incidental to the operation being performed by the tool or tools of the machine such as causing relative movement between the work and tools to complete a desired operation, means adapted to be operated when a predetermined pressure is built up to for admitting pressure fluid to said device for operating the same, another device associated with said machine operative under fluid pressure, said device being so related with the source of pressure fluid supply as to bring about the return movement of the carriages, and another means adapted to be operated when a higher predetermined pressure is built up to for admitting pressure fluid to said device to operate the same.

22. In a machine tool, the combination of a frame, a work support on said frame, a tool support on said frame, the one support being movable on the frame relative to the other support for the performance of an operation of the tool or tools on the work, the tool support having tools thereon for more than one operation, the tools or tools for one operation being so arranged with respect to the other tool or tools so as to permit use of the one independently of the other, one of said supports being shiftable from one position with relation to the other support to the next position whereby to change the relationship between the work and the tools after one operation has been performed, means for indexing the shiftable support, a single drive element associated with the different kinds of tools for operation thereof, change speed gears between the drive element and the tools for driving the same at different speeds as desired, shifting means cooperating therewith, and means arranged to automatically operate the shifting means in the movement of one of said supports whereby to have one kind of tools operated at one speed for one operation and another kind operated at a different speed for another operation.

23. In a machine tool, the combination of a frame, a work support on same frame, a tool support on said frame, means for reciprocating the one support toward and away from the other for the performance of an operation of the tool or tools on the work, and means arranged when the support reaches its forward limit to move the tool or tools relative to the support toward the work to a predetermined limit whereby to insure completion of the operation being performed before the reciprocable support commences its return movement.

24. In combination, a frame, a work support on said frame, a tool support on said frame, one of said supports being translatable toward and away from the other, fluid pressure means for translating said support operating normally at a given fluid pressure, a positive stop arranged to be engaged in the movement of said support at a predetermined point whereby to bring the support to a standstill, said support being arranged to pause in this position for a predetermined interval, means for performing a metal removing operation during the pause of said support, the pressure in the line being arranged to build up during the pause, and means operating, when a predetermined pressure is attained in the line, to control said fluid pressure means and cause retraction of said supports away from each other.

25. In a machine comprising a work support and tool support, means operative by fluid pressure for moving one support relative to the other for the performance of an operation on the work, the tool or tools of said tool support having variable speed means for driving the same including a control member arranged to be shifted for the different speeds, a single pump serving as the source of variable pressure fluid supply, a single control valve for controlling the pump's delivery shiftable automatically in the movement of the movable support to deliver fluid as desired to the first means, means operative under fluid pressure for shifting the control member of the second means, and another valve operable in the movement of the movable support to admit fluid pressure from the source to the last mentioned means.

26. In a machine comprising a tool support and a work support, one of said supports being movable relative to the other support for the performance of each of several operations on the work, the tool support having a plurality of tools for performing more than one operation on the work, a single variable delivery pump, a single control valve for controlling the pump delivery, means operative under fluid pressure for communicating movement to the movable support according to the shifting of said control valve, plural means for operating the control valve, each according to the requirements of the operation being performed, and means whereby each of said last mentioned means is rendered operative for the tools and operation identified therewith.

27. In a machine comprising a work support and tool support, means operative by fluid pressure for moving one support relative to the other for the performance of an operation on the work, the tool or tools of said tool support having driving means including a clutch having a shiftable control member, a pump serving as the source of variable pressure fluid supply, a single control valve for controlling the pump delivery shiftable automatically in the movement of the movable support to deliver fluid as desired to the first means, means operative under fluid pressure for shifting the clutch control member of the driving means, and another valve operable in the movement of the movable support to admit fluid pressure from the source to the last mentioned means.

28. In a hydraulically operated machine tool, a reciprocable carriage, a stop arranged to be engaged by the carriage to bring it to a standstill at a certain point in its travel, a variable delivery pump for supplying pressure fluid, a valve for controlling the delivery of said pump, means supplied with pressure fluid for moving the carriage arranged, when the latter is stopped, to cause pressure to be built up beyond the normal operating pressure, and a fluid operated device having communication with said means for performing an auxiliary machining function which is to be performed when the carriage is pausing in engagement with the stop, said device being operable under a predetermined fluid pressure above the normal operating pressure, whereby to be operated after engagement of the carriage with the stop.

29. In a machine comprising a reciprocating carriage, a variable delivery pump for supplying pressure fluid, means supplied therefrom with pressure fluid for communicating movement to said carriage, a valve for controlling the delivery of pressure fluid to said means from said pump, cam means for operating the valve in the movement of the carriage, a stop disposed for engagement by the carriage at a certain point in its travel, said pump being arranged to build up pressure in said means above the normal operating pressure while the carriage is at a standstill in engagement with the stop, and means communicating with the first mentioned means and operable at a predetermined pressure above the normal operating pressure to cause relative movement between the valve and cam means to shift the valve, whereby to cause the movement of the carriage away from the stop.

30. In a hydraulically operated machine comprising a reciprocating carriage, a source of pressure fluid supply, means operative under fluid pressure for communicating movement to said carriage, said means including a main cylinder, a main valve for controlling the delivery of pressure fluid from said source to said main cylinder, an auxiliary cylinder for operating an auxiliary device, and an auxiliary valve arranged to be operated when the carriage is in a certain position to deliver pressure fluid from the source to the auxiliary cylinder for operation of the auxiliary device.

31. In a machine tool, in combination, a sliding platen, an operating cylinder therefor, a tool slide carried by said platen, an operating cylinder for said tool slide, said last mentioned operating cylinder being carried by said platen, a source of fluid pressure, control means for controlling the delivery of fluid from said source, said source being connected to said cylinders to apply fluid under pressure to said cylinders in parallel circuits, and valve means responsive to pressure within said platen operating cylinder for controlling communication between said source and said slide operating cylinder.

32. In a machine tool or the like the combination of a carrier, a hydraulic motor for advancing and retracting the same, a hydraulic circuit including a variable delivery pump for driving said motor, a single means for varying pump delivery and changing communication between the pump and motor to thereby regulate the rate and direction of motion of said carrier, control mechanism including a plurality of means movable with said carrier and selectively operable to control said pump delivery varying means, and means automatically operable to render each of said plurality of means active successively.

33. In a machine tool or the like the combination of a carrier, a hydraulic motor for advancing and retracting said carrier, a hydraulic circuit including a variable delivery pump for driving said motor, a single means for varying pump delivery and changing communication between the pump and motor, a series of cams movable with said carrier and selectively active to control said delivery varying means, and a support for said cams operable to shift any of said cams into active position.

34. In a machine tool or the like the combination of a movable member, a hydraulic motor for driving the same, a hydraulic circuit including a variable displacement pump for driving said motor, a single valve for controlling the volume and direction of flow of fluid from the pump, a means including a plurality of cams for operating said valve, said cams being selectively operable to control pump displacement, and means for rendering any of said cams operable to control pump displacement.

35. In a machine comprising a work support and a tool support, one of said supports being movable relative to the other for the performance of an operation on the work, fluid operated means for communicating movement to the movable support, a variable delivery pump constituting the source of pressure fluid supply, a valve for controlling the pump's delivery, cam means for shifting the valve in the movement of said movable support, said pump having communication with the fluid operated means for delivering fluid thereto at a predetermined operating pressure for movement of the support, means for causing a change in pressure in the line from said predetermined operating pressure, and means responsive to the change in pressure for moving the cam means relative to the valve to secure a certain desired movement of the latter.

36. In a machine comprising a work support and a tool support, one of said supports being movable relative to the other for the performance of an operation on the work, fluid operated means for communicating movement to the movable support, a variable delivery pump constituting the source of pressure fluid supply, a single control valve for controlling the pump's delivery, said pump having communication with the fluid operated means for delivery of fluid thereto at a predetermined operating pressure to cause movement of the movable support, means for causing a change in pressure in the line from the predetermined operating pressure, and means responsive to the change in pressure for causing movement of the valve to effect a change in the movement of the movable support.

37. In a machine tool or the like the combination of a carrier, a hydraulic motor for advancing and retracting the same, a hydraulic circuit including a variable delivery pump for driving said motor, means for modifying the mechanical action of said pump for varying the delivery of said pump to thereby regulate the rate and direction of motion of said carrier, control mechanism including a plurality of means movable with said carrier and selectively operable to control said pump delivery varying means, and means automatically operable to render each of said plurality of means active successively.

38. In a machine tool or the like the combination of a movable member, a hydraulic motor for driving the same, a hydraulic circuit including a variable displacement pump for driving said motor, means including a plurality of cams selectively operable to control pump displacement, and means for rendering any of said cams operable to control pump displacement.

39. An automatic multiple spindle machine tool comprising, in combination, a bed, a work support mounted for reciprocatory indexing movement back and forth between two limit positions, manually controllable power actuated means by which said support may be moved from one of said positions to the other selectively, a tool head mounted on said bed for movement toward and away from said support, a set of parallel spindles rotatably mounted on said head and projecting toward said support, tools carried by said spindles and adapted to perform one metal-removing operation on the work piece in the advance of the head when said support is in one of said positions, a second set of spindles rotatably mounted on said head in parallel relation to said first mentioned spindles and spaced therefrom in a direction and a distance equal to the movement of said support, tools on said second spindles for performing a different metal-removing operation on the work piece when said support is in said other position, power driven mechanism for rotating all of said spindles and for imparting movements to said head at a rapid traverse rate and at the feed rates required for the different tools, and means responsive to the movements of said head and controlling said mechanism to define different automatic cycles of rapid approach, feed and rapid return motions of said head, said feed motions in the different cycles being of lengths corresponding to the operations performed by the respective sets of tools.

40. An automatic machine tool comprising, in combination, a bed, a work support mounted for reciprocatory movement between two limit operating positions, a tool head mounted on said bed for bodily movement toward and away from said support, a set of parallel spindles rotatably mounted on said head and carrying tools for performing one metal-removing operation on the work piece in the advance of the head when said support is in one of said positions, a second set of spindles rotatably mounted on said head in spaced parallel relation to said first mentioned spindles and carrying tools for performing a different metal-removing operation on the work piece when said support is in said other position, power driven mechanism for rotating all of said spindles and for imparting rapid traverse and feeding movements to said head, and means controlling said mechanism to define different automatic cycles alternately, each comprising rapid approach, feed and rapid return motions of said head and the feed motions of the alternate cycles being of different lengths corresponding to the operations performed by the respective sets of tools.

41. An automatic machine tool comprising, in combination, a bed, a member supporting a work piece for reciprocatory movement between two limit positions, a tool head mounted on said bed for movement toward and away from said support, a set of parallel spindles rotatably mounted on said head and carrying tools for performing a metal-removing operation on certain portions of the work piece in the advance of the head when the work piece is in one of said positions a second set of spindles rotatably mounted on said head in spaced parallel relation to said first mentioned spindles and carrying tools for performing a metal-removing operation on different portions of the work piece when the latter is in said other position, power driven mechanism for rotating said spindles and for imparting feeding movements to said head, and means responsive to the movements of said head and controlling said mechanism to define cycles of forward and reverse motions to be imparted to said head, the forward motions in alternate cycles being of lengths corresponding to the operations performed by the respective sets of tools.

42. An automatic machine tool comprising, in combination, a bed, a member supporting a work piece for reciprocatory movement between two limit positions, a tool head mounted on said bed for movement toward and away from said support, a set of parallel spindles rotatably mounted on said head and carrying tools for performing a metal-removing operation on certion portions of the work piece in the advance of the head when the work piece is in one of said positions, a second set of spindles rotatably mounted on said head in spaced parallel relation to said first mentioned spindles and carrying tools for performing a metal-removing operation on the work piece when the latter is in said other position, power driven mechanism for rotating said spindles and for imparting feeding movements to said head, and selectively operable control means responsive to the movements of said head and governing the operation of said mechanism to cause automatic cycles of rapid traverse and feed motions to be imparted to said head, said feed motions being adapted for the different sets of tools.

43. An automatic machine tool comprising, in combination, a bed, a member supporting a work piece for reciprocatory movement between two limit positions, a tool head mounted on said bed for movement toward and away from said support, a set of parallel spindles rotatably mounted on said head and carrying tools for performing a metal-removing operation on certain portions of the work piece in the advance of the head when the work piece is in one of said positions, a second set of spindles rotatably mounted on said head in spaced parallel relation to said first mentioned spindles and carrying tools for performing a metal-removing operation on the work piece when the latter is in said other position, power driven mechanism for rotating said spindles and for imparting feeding movements to said head, control means governing the operation of said mechanism to cause rapid traverse and feed motions to be imparted to said head, two sets of control devices each arranged for actuation of said control means in response to movement of said head and respectively adapted to define cycles of forward and return motions of said head corresponding to the tools of said sets, and manually controllable means by which said sets of devices can be rendered active selectively.

44. An automatic machine tool comprising, in combination, a support for a work piece to be operated upon, a bed, a unitary tool head slidably mounted on said bed for movement toward and away from said work support, a rotary cutting tool carried by said head for performing a metal-removing operation upon said work piece in the forward movement of the head, power driven means on the head for rotating said tool, coacting cylinder and piston elements, one being mounted on said head and the other being fixed to said bed, a power driven pump carried by said head and adapted to supply pressure fluid at different rates to either end of said cylinder, a control valve carried by said head and governing the flow of pressure fluid to said cylinder, a follower on said head arranged to actuate said valve, and stationary cam means operatively associated with said follower and acting during movement of said head to actuate said valve and define an automatic cycle of rapid approach, feed and rapid return motions of the head.

45. An automatic machine tool comprising, in combination, a support for a work piece to be operated upon, a bed, a unitary tool head slidably mounted on said bed for movement toward and away from said work support, a rotary cutting tool carried by said head for performing a metal-removing operation upon said work piece in the forward movement of the head, power driven means on the head for rotating said tool, coacting cylinder and piston elements, one being mounted on said head and the other being fixed to said bed, a power driven pump carried by said head and adapted to supply pressure fluid at different rates to either end of said cylinder, a control valve carried by said head and governing the flow of pressure fluid to said cylinder to determine the direction and extent of movement of the head at feed and rapid, traverse rates, and stationary means operatively associated with said valve and acting thereon during movement of said head to actuate the valve and define an automatic cycle of motions of said head.

46. An automatic machine tool comprising, in combination, a support for a work piece to be operated upon, a bed, a unitary tool head slidably mounted on said bed for movement toward and away from said work support, a rotary cutting tool carried by said head for performing a metal-removing operation upon said work piece during movement of the head, power driven means on the head for rotating said tool, coacting cylinder and piston elements, one being mounted on said head for movement therewith and the other being stationary, a pump carried by and movable with said head and arranged to supply pressure fluid at different rates, a control valve carried by said head and governing the flow of pressure fluid from said pump to said cylinder, and means responsive to movements of said head and actuating said valve to cause an automatic cycle of rapid traverse and feed motions of the head.

47. A machine tool having, in combination, a tool support having two spaced sets of tools, a work support, said supports being mounted for operating movement toward and away from each other along one path to bring one set of the tools into engagement with the work and for indexing movement along a transverse path to bring one set or the other of said tools into operative relation to the work, power driven means for rotating said tools including speed change mechanism by which the different tools may be rotated at different speeds corresponding to the operations to be performed thereby, and means operated automatically in the movement of said supports relative to each other to operate said speed change mechanism and cause rotation of the tools at the rate corresponding to the tools next to operate upon the work.

48. A machine tool having, in combination, work and tool supports mounted for movement relative to each other, a plurality of rotary tools on the tool support engageable successively with the work in the advance of the supports toward each other, power driven means for rotating said tools including speed change mechanism by which the speed of rotation of the different tools may be varied to correspond to the character of the operations to be performed by the respective tools, and means operating automatically after one tool has performed its operation on the work to actuate said mechanism and change the speed of rotation of said tools preparatory to operation of the other tool on the work.

EVERETTE K. MORGAN.